United States Patent [19]
Wang et al.

[11] Patent Number: 6,007,749
[45] Date of Patent: Dec. 28, 1999

[54] WATER INJECTION FOAMING DEVOLATILIZING METHOD AND APPARATUS

[75] Inventors: Ning-He Wang; Norimasa Oda; Seiji Takamoto; Yoshitaka Kimura; Hideki Mizuguchi, all of Hiroshima, Japan

[73] Assignee: The Japan Steel Works, Ltd., Tokyo, Japan

[21] Appl. No.: 09/035,148

[22] Filed: Mar. 5, 1998

[30] Foreign Application Priority Data

Mar. 12, 1997 [JP] Japan .................................. 9-057954

[51] Int. Cl.[6] .............................. C04B 33/32; C08F 6/00
[52] U.S. Cl. .............................. 264/53; 264/51; 425/208; 425/812; 528/499
[58] Field of Search ........................ 264/51, 53; 425/208, 425/812; 528/499

[56] References Cited

U.S. PATENT DOCUMENTS 5,630,968   5/1997   Wang et al. ............................... 264/53

Primary Examiner—Terressa Mosley
Attorney, Agent, or Firm—Sughrue, Mion, Zinn, Macpeak & Seas, PLLC

[57] ABSTRACT

A water injection foaming devolatilizing method, and an apparatus for practicing the method according to the invention are designed as follows: A molten polymer material is kneaded in a water-injection dispersion zone (11) of an extruding machine having a pair of screws (6) each of which is turned in the same direction. Water is supplied to the molten polymer material, thus the water being dispersed therein while the molten polymer material is kneaded. In a devolatilizing zone (12) downstream of the water-injection dispersion zone, the volatile components in the molten polymer material are removed by being gasified together with the water. In this water injection foaming devolatilizing method, the molten polymer material is smoothly extruded from the filling zone (10) to the water-injection dispersion zone (11), and in the latter zone (11) water injection is performed with increased pressure due to the aid of a ring (15), thereby to achieve the devolatilizing of the molten polymer material.

8 Claims, 4 Drawing Sheets

6,007,749

WATER INJECTION FOAMING DEVOLATILIZING METHOD AND APPARATUS

BACKGROUND OF THE INVENTION

1. Field of the Invention

This invention relates to a polymer water injection foaming devolatilizing method, and an apparatus for practicing the method, and more particularly to a novel improvement to remove volatile components from a molten polymer material with high efficiency.

2. Related Art

Heretofore, as for a conventional water injection foaming devolatilizing method, and a conventional apparatus for practicing the method, an extruding machine designed as shown in FIGS. 2 through 5 is employed. In FIG. 2, reference numeral 1 designates a cylinder showing a part of the upper portion of a twin screw type extruding machine 2. In the upper surface of the cylinder 1, a material supply port 3, a water injection port 4, and a vent port in the stated order as viewed from upstream. And in the cylinder 1, two screws which turn in the same direction are rotatably provided in such a manner that they are engaged with each other.

The cylinder 1 has a filling zone 10, a water injection zone 11 having a water injection port 4, and a devolatilizing zone 12 having the vent port 5 in the stated order as viewed in the direction of flow. The aforementioned screw 6 in the filling zone is made up of a full-flight screw 6a, the screw in the water injection dispersion zone 11 is made up of a second ring 13, a plurality of kneading-dispersing screws 14, and a first ring 15 which are arranged in the stated order as viewed in the direction of flow, and the screw 6 in the devolatilizing zone 12 is made up of a full-flight screw 6b.

FIG. 3 shows a pressure-reduction expansion zone 17. More specifically, in the structure shown in FIG. 3, a pressure-reduction expansion zone special ring 16 (shown in FIG. 4) is provided immediately behind the first ring 15 of the devolatilizing zone.

Under the condition, the polymer material supplied from the material supply port 3 is being extruded by the screw 6 while being molten and kneaded, the water injected from the water injection port 4 is dispersed in the high temperature molten polymer material under high pressure which is filled in the injection water dispersion zone. This high pressure is maintained by the extruding action of the screw 6 located upstream of the second ring 13 and by the damming action of the first ring 15, and it is higher than the saturated steam pressure of water when the injected water is dispersed in the high temperature molten polymer material. The devolatilizing zone 12 located downstream of the first ring 15 is in vacuum state. Hence, when passing through the first ring 15, the pressure of the molten polymer material is abruptly reduced, and the water dispersed in the molten polymer material is abruptly foamed. In this case, the volatile components contained in the molten polymer material start to disperse into the foams through the foam/polymer interface from the instant the foaming phenomenon occurs. On the other hand, in the foamed molten polymer material, the foams therein are broken by the shearing action of the screw 6 in the devolatilizing zone located downstream of the first ring 15. As a result, the volatile components in the foams are dispersed outside of the molten polymer material, and discharged outside through the vent port 5.

On the other hand, by means of the pressure-reduction expansion zone special ring 16 located immediately behind the first ring 15, the molten polymer material is slowly reduced in pressure after passing through the first ring 15, so that the foams grow sufficiently; that is, they are long in retention time. As a result, the molten polymer material is sufficiently degassed.

The conventional water injection foaming devolatilizing method and apparatus are designed as described above. Therefore, they suffer from the following problems. First, since the extruding machine employs a pair of rings, and one of the rings is provided upstream of the water injection dispersion zone, the resistance of flow thereat is high. Hence, when the molten polymer material passes through the clearance between the ring and the cylinder, the pressure of the molten polymer material is reduced, so that the water injection pressure and the amount of extrusion are not high enough. Second, at the clearance section of the ring, shearing heat is generated. Hence, it is impossible to improve the devolatilizing efficiency; that is, it is impossible to obtain a large number of revolutions of the screw, a high water injection pressure, and a high water dispersion effect. Third, the region between the pressure-reduction expansion zone special ring 16 located downstream of the pressure-reduction expansion zone and the first ring 15 located upstream thereof is not self-cleaned.

SUMMARY OF THE INVENTION

In view of the foregoing, an object of the invention is to provide a water injection foaming devolatilizing method in which the volatile components in a molten polymer material are removed with high efficiency, and to provide an apparatus for practicing the method.

A water injection foaming devolatilizing method is designed as follows: a molten polymer material kneaded in a water-injection dispersion zone of an extruding machine having screws 6 which are rotated in the same direction is kneaded and dispersed with water supplied thereto, and in a devolatilizing zone located downstream thereof the volatile components in the molten polymer material are removed, being gasified together with the water. According to the present invention, the molten polymer material is smoothly protruded from a filling zone located upstream of the extruding machine to the water-injection dispersion zone, and a ring is provided as a resisting element only in the water-injection dispersion zone, whereby water injection is carried out with the amount of molten polymer material and the pressure increased.

Furthermore, in the method, an extruding and self-cleaning pressure-reduction expansion zone is provided between the downstream end of the water-injection dispersion zone and a vent port of the devolatilizing zone, to decrease the rate of flow of the molten polymer material.

A water injection foaming devolatilizing apparatus of the invention includes an extruding machine. The latter comprises a cylinder having a material supply port, a water injection port and a vent port located in the stated order as viewed from upstream thereof, and incorporates two screws which are rotated in the same direction in such a manner that they are engaged with each other. Further, the extruding machine has a filling zone, a water-injection dispersion zone having the water injection port, a pressure-reduction expansion zone, and a devolatilizing zone having the vent port, arranged in the stated order as viewed from upstream of the extruding machine. In the apparatus, according to the invention, a ring is provided only downstream of the water injection port of the water-injection dispersion zone, and the water-injection dispersion zone is provided in at least one position in the extruding machine.

DETAILED DESCRIPTION OF THE PREFERRED EMBODIMENT

Figure 1:
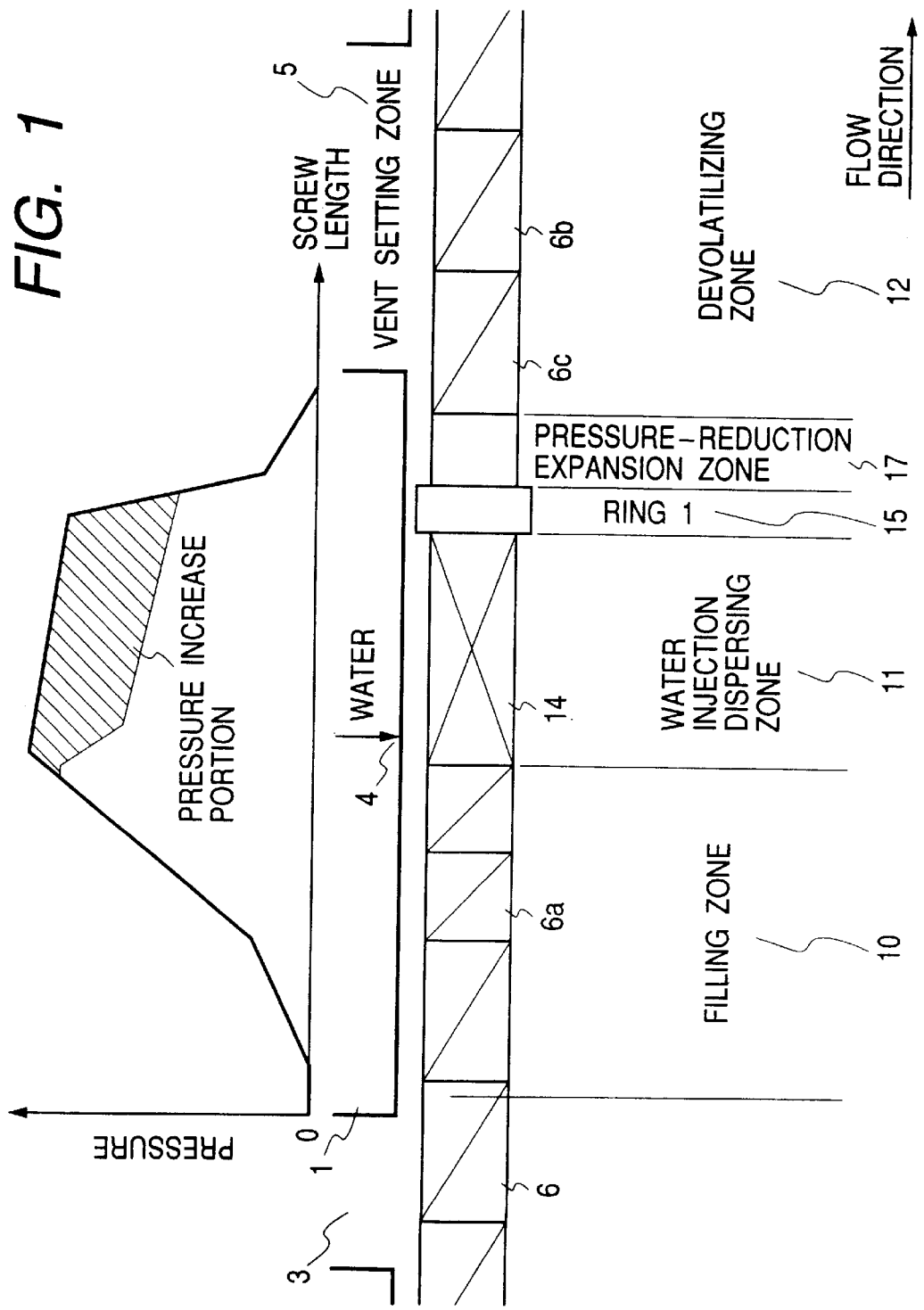
FIG. 1 is a diagram showing an axial section of an apparatus practicing a water injection foaming devolatilizing method according to the invention, and a pressure characteristic as viewed in the axial direction.

A water injection foaming devolatilizing method, and an apparatus for practicing the method, a preferred embodiment of the invention, will be described with reference to the accompanying drawings. In the following description, parts corresponding functionally to those already described with reference to the prior art are therefore designated by the same reference numerals or characters. FIG. 1 shows an axial section of an apparatus performing a water injection foaming devolatilizing operation (an extruding machine) according to the invention, and a pressure characteristic as viewed in the axial direction.

Figure 2:
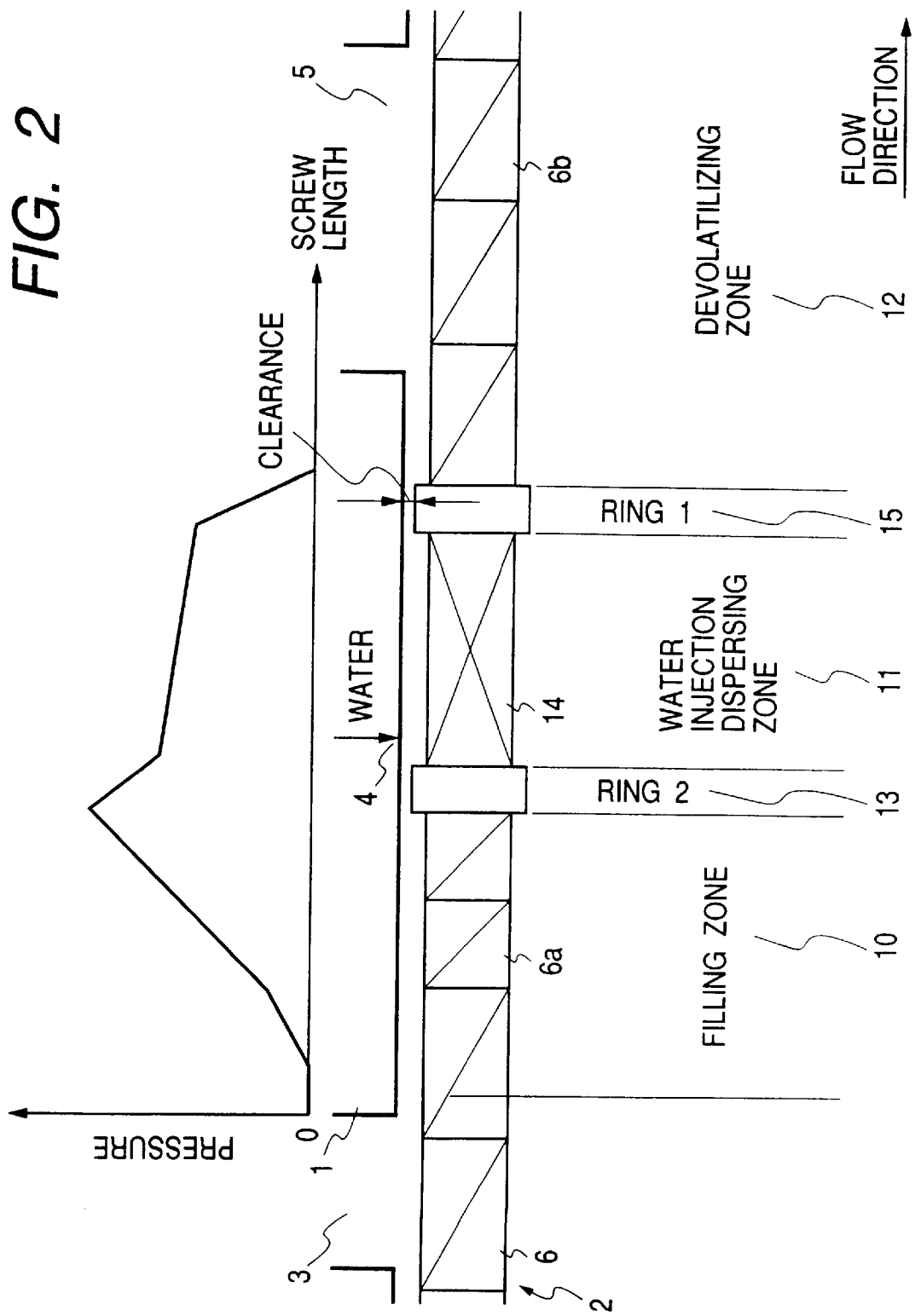
FIG. 2 is a diagram showing an axial section of an apparatus practicing a conventional water injection foaming devolatilizing method, and a pressure characteristic as viewed in the axial direction.
Figure 3:
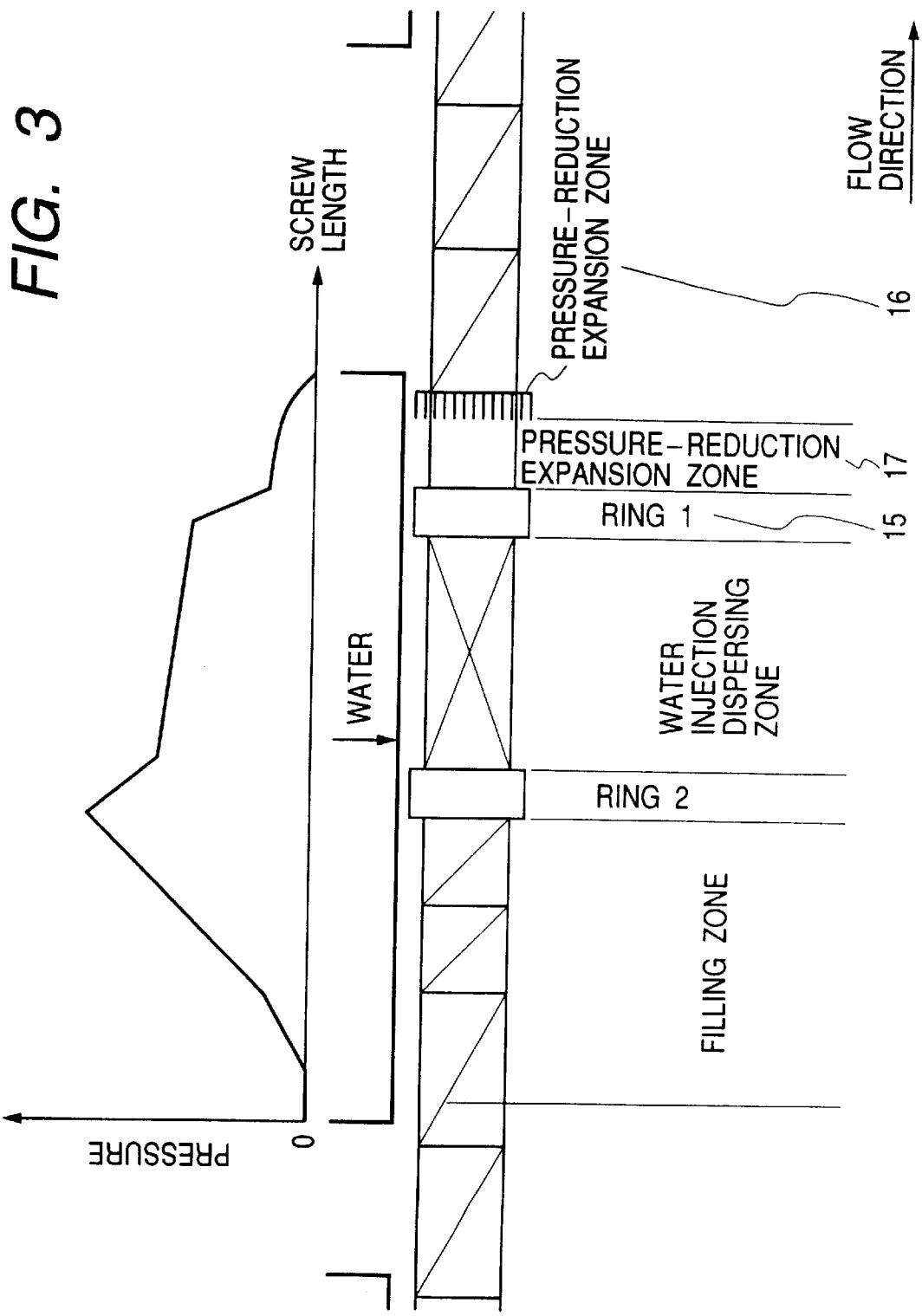
FIG. 3 is a diagram showing an axial section of another apparatus practicing the conventional water injection foaming devolatilizing method, and a pressure characteristic as viewed in the axial direction.
Figure 4:
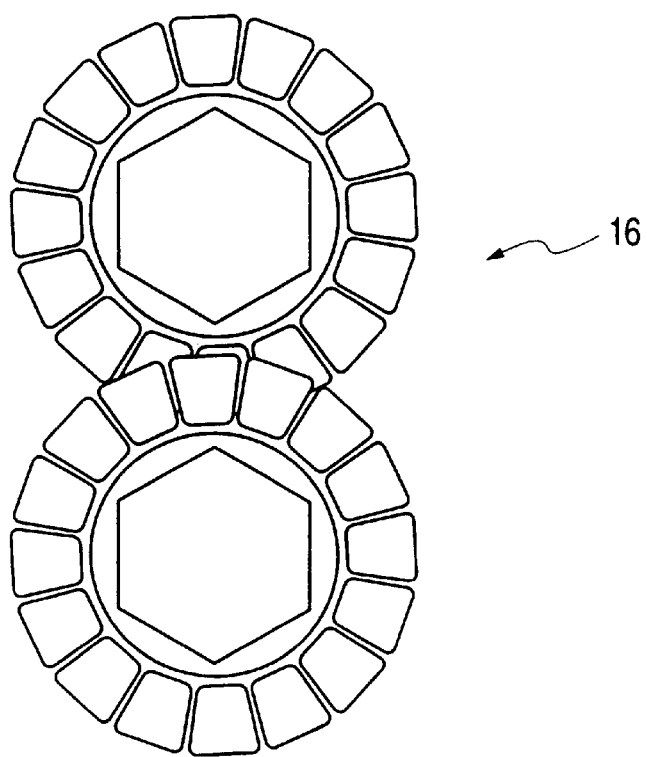
FIG. 4 is a front view of a special ring applied to the apparatus shown in FIG. 3.
Figure 5:
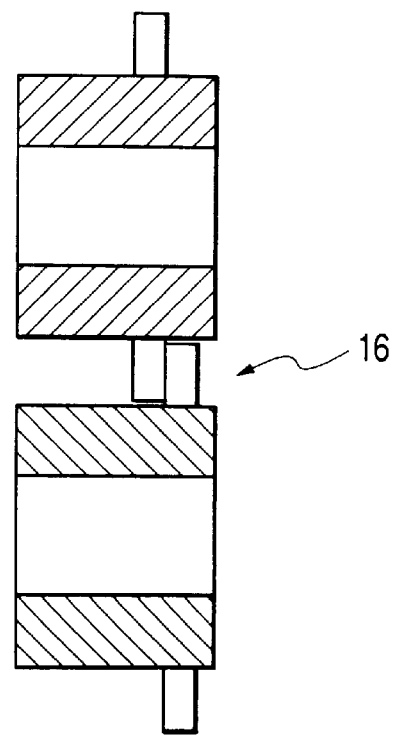
FIG. 5 is a sectional side view of the special ring shown in FIG. 4.

In FIG. 1, reference numeral 1 designates a cylinder, showing part of the upper portion of a twin screw type extruding machine 2. In the upper surface of the cylinder 1, a material supply port 3, a water injection port 4, and a vent port 5 are formed in the stated order as viewed from upstream. In the cylinder 1, two screws 6 rotate in the same direction (only one shown in FIG. 1) in such a manner that they are engaged with each other. The cylinder 1 has a filling zone 10, a water injection dispersion zone having the water injection port 4, a pressure-reduction expansion zone 17, and a devolatilizing zone 12 having the vent port 5 in the stated order as viewed from upstream. The screw 6 in the filling zone 10 is made up of a full-flight screw 6a similarly as in the case of FIGS. 2 and 3. The full-flight screw 6a is followed by the screw 6 in the water injection dispersion zone 11. This screw 6 is made up of forward, perpendicular and reverse kneading disks, or a plurality of kneading dispersing screws 14 which are other types and combinations, wherein only one ring is provided at the downstream end. Hence, no ring resistance is present on the downstream side of the filling zone. Therefore, the delivering capacity under pressure is improved. Under the condition that the polymer material supplied through the material supply port 3 is extruded while being kneaded by the screw 6, as shown in the characteristic diagram the high pressure of the water injection dispersion zone is made higher than in the prior art (shaded lines), and the water injected from the water injection port 4 is sufficiently dispersed in the molten polymer material which is in the state of water, or in the state of high density that the amount of gasification is minimum. Furthermore, the shearing heat is decreased, and accordingly the water dispersion is improved. Further, the number of revolutions of the screw 6 can be increased which is necessary for the breakage of the foams in the pressure-reduction expansion zone 17 and the devolatilizing zone 12.

The screw 6 in the pressure-reduction expansion zone 17 is made up of an extruding full-flight screw 6c up to the inlet of the vent port 5 which is high in cleaning characteristic, and the screw 6 in the devolatilizing zone 12 is made up of a full-flight screw 6c. As a result, the rate of flow of the molten polymer material which is in the pressure reduction foaming state passing through the ring 15, is decreased. As a result, the breakage of the foams in the molten polymer material by the shearing force of the self-cleaning screw element is increased, and the devolatilizing effect is improved. The employment of the self-cleaning screw element in the pressure-reduction expansion zone 17 enhances the self-cleaning characteristic, and makes the retention time of the molten polymer material uniform, and prevents the deterioration of the molten polymer material.

The devolatilizing zone 12 located downstream of the pressure-reduction expansion zone 17 is in the state of vacuum.

Hence, when the molten polymer material passes through the ring 15, the pressure of the molten polymer material is abruptly decreased, so that the water dispersed in the molten polymer material is gasified, so that it is abruptly foamed. In this case, the volatile components contained in the molten polymer material start to disperse into foams through the foam/polymer interface from the time instant the foaming phenomenon occurs. On the other hand, in the foamed molten polymer material, the foams therein are broken by the shearing action of the screw 6 in the devolatilizing zone 17 located downstream of the first ring 15. As a result, the volatile components in the foams are dispersed outside of the molten polymer material, and discharged outside through the vent port 5.

The method and apparatus of the invention are designed as described above, and therefore they have the following effects or merits. First, in the extruding machine, the ring is provided only in the water-injection dispersion zone. Hence, the molten polymer material is smoothly extruded from the filling zone to the water-injection dispersion zone, whereby in the water-injection dispersion zone the water injection pressure is sufficiently high, and the number of revolutions of the screw is increased. That is, the water dispersion is effected with high efficiency, and not only the devolatilizing efficiency but also the amount of extrusion is increased.

Furthermore, in the invention, since the ring located upstream of the water-injection dispersion zone in the prior art is replaced with the extruding full-flight screw, in the water-injection dispersion zone the water injection pressure is sufficiently high; that is, the method and apparatus of the invention are improved in processing capacity.

What is claimed is:

1. A water injection foaming devolatilizing apparatus comprising:
   an extruding machine including:
   a cylinder having a water injection port and a vent port located in the stated order as viewed from upstream thereof, and said cylinder incorporating two screws rotated in the same direction in such a manner that said screws are engaged with each other;
   a filling zone, a water-injection dispersion zone having said water injection port, a pressure-reduction expansion zone, and a devolatilizing zone having said vent port being arranged in the stated order as viewed from upstream of said extruding machine; and a ring provided downstream of said water injection port of said water-injection dispersion zone, wherein no ring is provided upstream of said water injection port, between said water-injection dispersion zone and said filling zone.

2. A water injection foaming devolatilizing apparatus as claimed in claim 1, further comprising:

an extruding pressure-reduction expansion zone provided between the downstream end of said water-injection dispersion zone and a vent port of said devolatilizing zone, to lower the rate of flow of said molten polymer material.

3. A water injection foaming devolatilizing method in which a molten polymer material kneaded in a water-injection dispersion zone of an extruding machine having two screws which are rotated in the same direction is kneaded and dispersed with water supplied thereto, and in a devolatilizing zone located downstream thereof the volatile components in said molten polymer material are removed, being gasified together with the water, comprising the steps of:

smoothly protruding said molten polymer material from a filling zone located upstream of said extruding machine to said water-injection dispersion zone, and performing water injection, through a water injection port in said water-injection dispersion zone, under increased pressure by providing a ring as a resisting element in said water-injection dispersion zone, wherein no ring is provided upstream of said water-injection port, between said water-injection dispersion zone and said filling zone.

4. A method as claimed in claim 3, wherein an extruding pressure-reduction expansion zone is provided between the downstream end of said water-injection dispersion zone and a vent port of said devolatilizing zone, thereby lowering the rate of flow of said molten polymer material.

5. A water injection foaming devolatilizing apparatus as claimed in claim 1, wherein no ring is provided downstream of said water injection port, between said pressure-reduction expansion zone and said devolatilizing zone.

6. A water injection foaming devolatilizing apparatus as claimed in claim 1, wherein said ring is located between said water-injection dispersing zone and said pressure-reduction expansion zone.

7. A method as claimed in claim 3, further comprising a pressure-reduction expansion zone provided between said water-injection dispersing zone and said devolatilizing zone, wherein no ring is provided between said pressure-reduction expansion zone and said devolatilizing zone.

8. A method as claimed in claim 3, further comprising a pressure-reduction expansion zone provided between said water-injection dispersing zone and said devolatilizing zone, wherein said ring is provided between said water-injection dispersing zone and said pressure-reduction expansion zone.

* * * * *